United States Patent [19]

Collette

[11] Patent Number: 4,827,854
[45] Date of Patent: May 9, 1989

[54] REFLUX VOLATILIZATION SYSTEM

[76] Inventor: Jerry R. Collette, P.O. 1482, Englewood, Fla. 34295-1482

[21] Appl. No.: 194,203

[22] Filed: May 16, 1988

[51] Int. Cl.[4] .............................................. F23G 7/00
[52] U.S. Cl. ..................... 110/237; 110/216; 110/226; 110/236; 110/246
[58] Field of Search ........................ 110/218–219, 110/224–228, 235, 246, 255, 257–258, 216, 237–238; 432/103, 105, 108, 111; 34/130, 132, 133, 135, 137

[56] References Cited

U.S. PATENT DOCUMENTS

| | | | |
|---|---|---|---|
| 2,653,393 | 9/1953 | Bojner | 34/137 |
| 3,744,145 | 7/1973 | Maxwell et al. | 110/227 X |
| 4,245,571 | 1/1981 | Przewalski | 110/216 X |
| 4,262,611 | 4/1981 | Kuhnert et al. | 110/228 X |
| 4,311,103 | 1/1982 | Hirose | 110/224 X |
| 4,314,513 | 2/1982 | Berthiller | 110/224 |
| 4,391,206 | 7/1983 | Matteini | 110/246 |
| 4,437,418 | 3/1984 | Guilleme et al. | 110/226 X |
| 4,499,833 | 2/1985 | Grantham | 110/237 X |
| 4,667,609 | 5/1987 | Hardison et al. | 110/246 X |
| 4,700,638 | 10/1987 | Przewalski | 110/246 X |
| 4,730,564 | 3/1988 | Abboud | 110/246 |
| 4,738,206 | 4/1988 | Nolero | 110/228 X |
| 4,765,255 | 8/1988 | Chierva | 110/226 |

*Primary Examiner*—Steven E. Warner
*Attorney, Agent, or Firm*—Charles J. Prescott; Raymond H. Quist

[57] ABSTRACT

A system for receiving and removing contaminants from soil, sand, etc. which has been contaminated by liquid contaminants. The contaminated material is heated in a rotating chamber sufficiently to volatilize the contaminants. The volatilized contaminents flow from one end of the chamber while the separated material is discharged from the other end as an uncontaminated material. Dust is removed from the volatilized contaminants and they are fed into a combustion chamber for conversion to harmless products of combustion.

14 Claims, 3 Drawing Sheets

REFLUX VOLATILIZATION SYSTEM

BACKGROUND OF THE INVENTION

1. Field of the Invention

This invention relates generally to the removal of contaminants from soil, sand, etc., and more particularly to efficacious apparatus for such purposes.

Materials such as hydrocarbons and other contaminants including hazardous wastes have been found with frightening frequency in large volumes of soil and sand at many diverse locations. This contamination has been caused, in some cases, by inadequate disposal or containment practices and equipment, by accident or even by natural occurrence.

Recognition of the detrimental environmental effects associated with this contamination has resulted in the removal of large volumes of earth from the original site to a new disposal area. In other cases, on site treatment of contaminated soil by heating to decompose hydrocarbon contaminants into harmless products of combustion has been performed.

The problem of disposal or treatment of contaminated soils is a significant problem partly, if not primarily, because of the large volume of such material. Separation of the contaminants from the soil permits ready disposition of the soil which represents the larger volume proportion of the mixture, and facilitates separate disposition of the contaminants. Often the contaminants are hydrocarbons or other materials which can be safely disposed of by pyrolization.

DESCRIPTION OF RELATED ART

U.S. Pat. No. 4,499,833, Grantham, entitled: "Thermal Conversion of Wastes", deals with liquid wastes or solids which are readily placed in solution for treatment, and does not directly address the problem of contaminated soil or the like.

U.S. Pat. No. 4,667,609, Hardison et al., entitled: "Apparatus and Method for Treatment of Soil Contaminated with Hydrocarbons", discloses apparatus including a conveyor belt on which soil is loaded and carried through a furnace having heating zones which are about 2900° F. so as to cause complete combustion of hydrocarbons outgassed from the soil by the furnace.

U.S. Pat. No. 4,700,638, Przewalski, entitled: "Method and Apparatus for Soil Detoxification", discloses apparatus for treatment of soil contaminated with combustible toxic materials which involves heating the contaminated soil sufficiently to convert it to gases and noncombustible ash, i.e. 350°-750° C., in a rotary chamber. Gases are then treated to remove dust particles.

None of the foregoing patents disclose or suggest an initial treatment of soil involving separation of the contaminant from the soil.

It is therefore an object of this invention to provide apparatus which initially separates the contaminating matter from the soil, sand, or the like.

It is a further object of this invention to provide apparatus for treatment of the separated contaminating matter to remove entrained dust.

It is also an object of this invention to provide apparatus for converting the contaminating matter to nonhazardous products of combustion.

In accordance with these and other objects, which will become apparent hereafter, the instant invention will now be described with reference to the accompanying drawings.

SUMMARY OF THE INVENTION

Soil, sand, or the like which is contaminated by liquid hydrocarbons or other objectionable matter in liquid form is fed, with additional clean aggregate, preferably limestone, if appropriate into a rotary volatilizer at one end. The rotary volatilizer is a longitudinally extending, cylindrical housing having radially inwardly extending lifts which carry the solids to the upper part of the volatilizor until they spill from the lifts forming curtains of descending solids. The volatilizer is inclined so that the solids proceed to the other end where they are discharged. Hot gases are introduced at this other end to effect a counterflow arrangement. These gases are admitted in a volume and temperature sufficient to heat the contaminating liquids and cause them to volatilize. These volatilized contaminants mix with the heating gas and exit the volatilizer at the end where the solids were introduced.

The gases may have cold air added if necessary to bring them to an optimum temperature. The gases may have entrained dust and are passed into an inertia separator—preferably a cyclone. The dust removed in the cyclone is added to the solids from the volatilizer and the gas is passed into a baghouse where additional entrained dust is removed and added to the other solids.

An exhaust fan is used to move the gas through the foregoing apparatus and blows this reflux gas into a reflux gas chamber of a furnace having a central fuel nozzle with a plurality of air/reflux gas nozzles. The furnace typically operates at a temperature of from 2450° to 2950° F. A portion of the products of combustion (which are not hazardous) is exhausted through a stack extending from the furnace. The remainder is provided to the rotary volatilizer as described above. An exhaust louver, down stream from the rotary volatilizer, is opened or closed further to cause a larger or lesser portion of the products of combustion to pass through the rotary volatilizer.

DETAILED DESCRIPTION OF THE INVENTION

Figure 1:
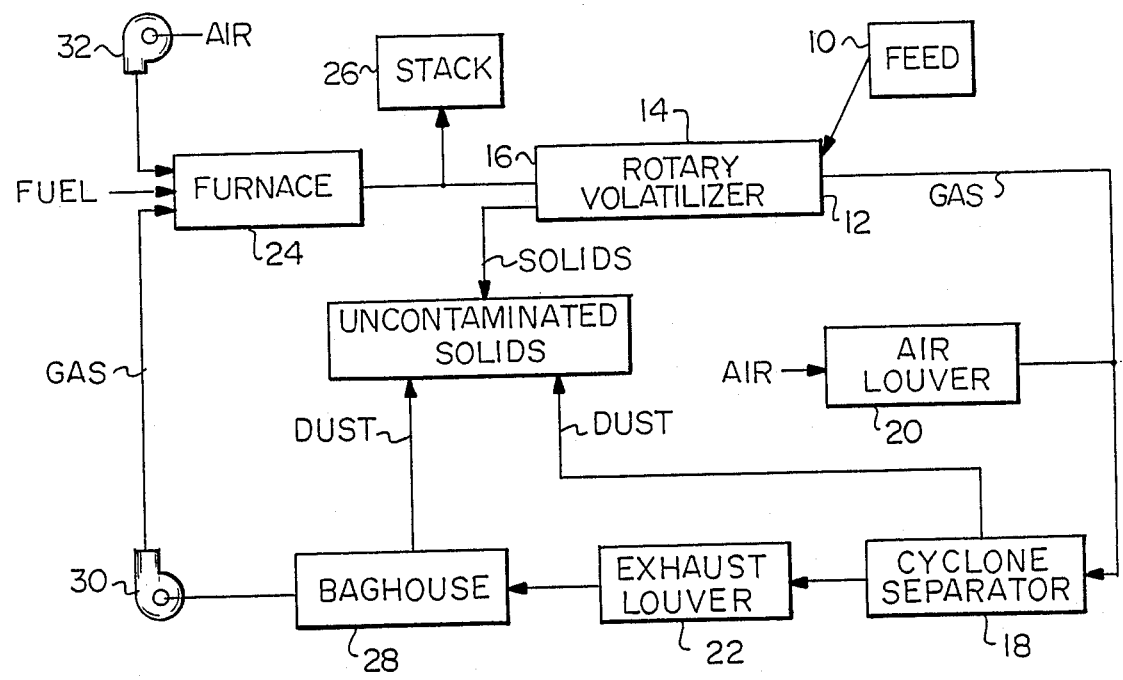
FIG. 1 is a block diagram of a reflux volatization system in accordance with the invention.

Referring to FIG. 1, the soil, sand, or other material which has been contaminated, preferably along with uncontaminated aggregate such as gravel is fed by feed 10 into end 12 of rotary volatilizer 14. A preferred uncontaminated aggregate is limestone which reacts with sulpher oxides. Rotary volatilizer 14 is rotating and inclined so that the solids will move toward the opposite end 16 where they are discharged. Hot gas supplied to rotary volatilizer 14 at end 16 passes through rotary volatilizer 14 in a counterflow relationship with the solids and is discharged at end 12. Frequently the contaminants are hydrocarbons such as gasoline, fuel oil, etc. which are liquid at atmospheric temperatures and which tend to wet the solid material and so will not drain off. In accordance with the invention, the interior of rotary volatilizer 14 is maintained at a temperature high enough to cause these liquid contaminants to be volatilized (typically 600° to 800° F.). These volatilized contaminants mix with the gas used for heating and this reflux gas is conveyed to cyclone separator 18. The gas leaving rotary volatilizer 14 may be at a temperature which is higher than desired in later elements of the system. Air louver 20 permits the introduction of cooling air in a desired volume to cool the reflux gas. Cyclone separator 18 is a preferred form of inertia separator which is used to remove most of the entrained dust from the reflux gas.

Exhaust louver 22 is positioned at some point in the reflux gas line after rotary volatilizer 14. Exhaust louver 22 is controlled to reduce or increase the flow of reflux gas by changing the pressure drop across it. In the system of FIG. 1, furnace 24 supplies the hot gas to rotary volatilizer 14. Any excess gas produced by furnace 24 passes out stack 26. Thus exhaust louver 22 serves to control the gas flow to rotary volatilizer 14 and thereby the temperature in rotary volatilizer 14.

Baghouse 28 is provided to further filter the reflux gas. Dust removed in baghouse 28 and by cyclone separator 18 is combined with the uncontaminated solids which are discharged from end 16 of rotary volatilizer 14.

The reflux gas is drawn through the system by blower 30 which supplies this gas to furnace 24. Blower 32 provides air to furnace 24 to serve as the oxidizer for both the fuel and the reflux gas. Where the contaminants which have been separated from the solids are hydrocarbons, combustion in the furnace will convert these to harmless products of combustion.

It should be recognized that other liquid contaminants can be separated from solids by rotary volatilizer 14. It may not be feasible to convert all liquid contaminants to harmless products of combustion, so that in some cases the gas may require different treatment beyond the scope of this invention. Also, some political entities may require additional equipment. For example, in California the South Coast Air Quality Management Division requires the addition of sulfur oxide scrubbers and nitrous oxide scrubbers as well as certified chart recorder monitoring equipment for both these oxides, particulates and hydrocarbons.

Figure 2:
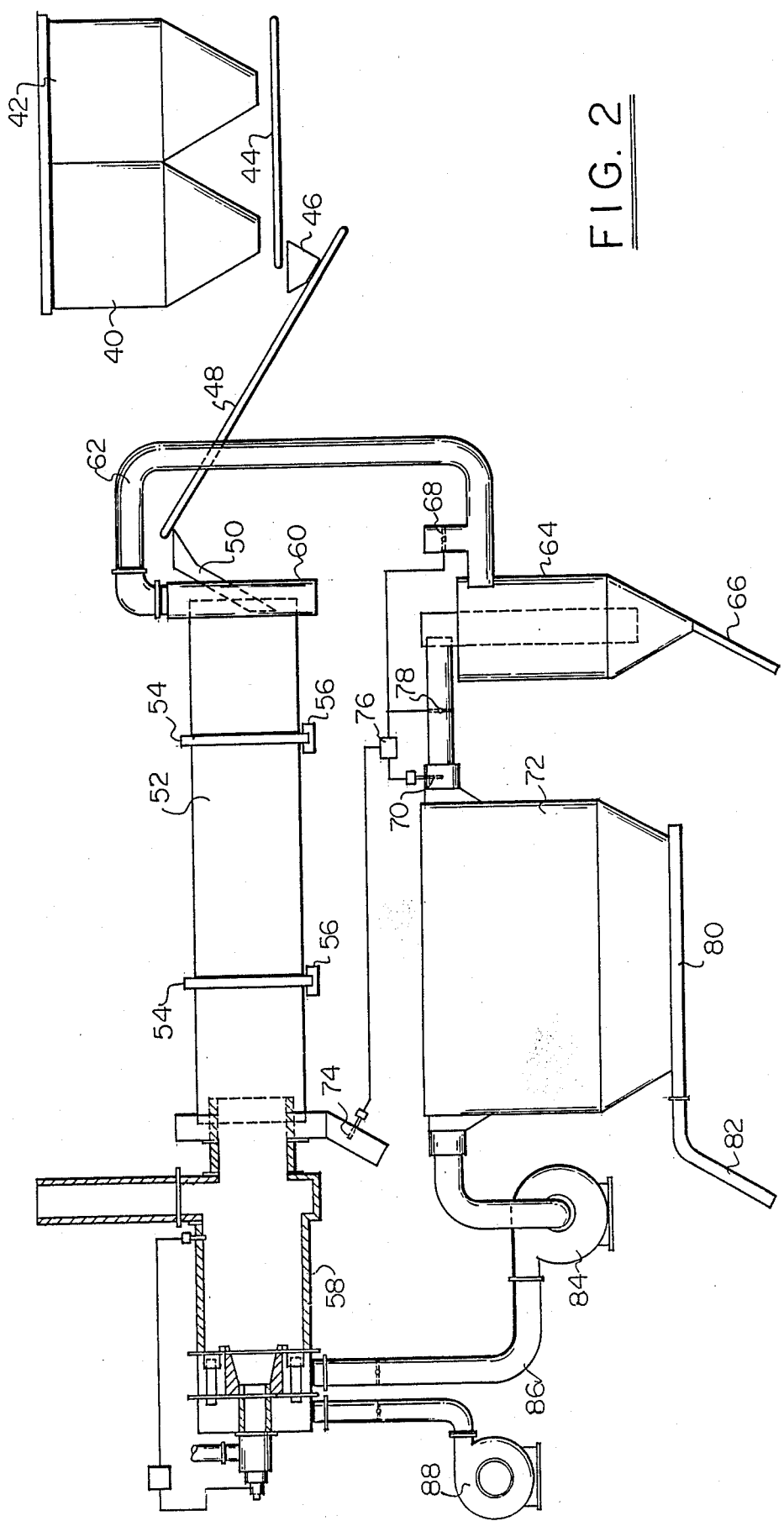
FIG. 2 is a schematic showing a layout of a reflux volatization system in accordance with the invention.

Turning now to FIG. 2, bin 40 contains contaminated solids, while bin 42 contains clean aggregate preferably limestone of ¾ inch screen size. The contents of bins 40 and 42 are deposited at a controlled rate on conveyor belt 44 which carries it to weigh bridge assembly 46 which monitors and controls the feed rate and deposits the material on inclined conveyor 48. Conveyor 48 carries the material to entry chute 50 which includes an air flap to minimize introduction of air into volatilizer 52. Volatilizer 52 has a horizontally extending, rotatably mounted, cylindrical housing which is inclined downward from the end at which entry chute 50 is located. An effective inclination has been found to be one half inch to one foot. Trunnions 54 have standard friction drives 56 which cause volatilizer 52 to rotate at a relatively slow rate such as seven RPM. On the inside wall of volatilizer 52 are mounted a plurality of spaced lifting flights which extend inwardly. These flights carry the material upwardly until it spills off producing curtains of material. The device used as volatilizer 52 is a six foot diameter, thirty four foot long rotary sand dryer available from CMI Corporation of Oklahoma City, Oklahoma. The flights in this drum produce curtains of aggregate which have no discernable passages therethrough, but which are not so dense as to unacceptably reduce the flow of gases.

At the other end of volatilizer 52, furnace 58 produces hot gases —a portion of which flow through volatilizer 52—in counterflow arrangement with the solid material. This hot gas flow through the curtains of material exposes the liquid contaminants on the surfaces of the solid material to heat which raises the temperature to from 600° to 800° F. thereby causing vaporization of the liquid contaminants.

Shroud 60 conveys the gases from volatilizer 52 into conduit 62 which carries them to cyclone 64. Cyclone 64 is a standard commercially available dust separator which deposits separated dust of larger sizes (40 through 100 screen mesh) through chute 66.

As previously indicated with respect to FIG. 1, it may be necessary to cool the gases, particularly before entering the baghouse so as not to cause deterioration of the bags. Damper 68 is electrically controlled to take a position introducing the proper amount of cool air into conduit 62. Temperature probe 70 monitors the temperature of the gas as it enters baghouse 72. Temperature probe 74 monitors the temperature of the solid material as it leaves volatilizer 52. These temperatures are fed to control 76. It is necessary that the desired temperature be maintained in volatilizer 52. This temperature is controlled by the position of damper 78. A hotter temperature results when damper 78 is opened wider and vice versa. With this damper set properly, damper 68 is then set to provide the proper temperature for the dust separation equipment.

In baghouse 72, fine dust (100 mesh and 200+ mesh sizes) is removed from the gas and moved by dust auger 80 to chute 82. All separated dust is recombined with the solid material leaving volatilizer 52 for disposition.

Blower 84 has drawn the gas through the system up to this point, and now impels it through conduit 86 to furnace 58. Blower 88 supplies fresh air to furnace 88 for a purpose to be described.

Figure 3:
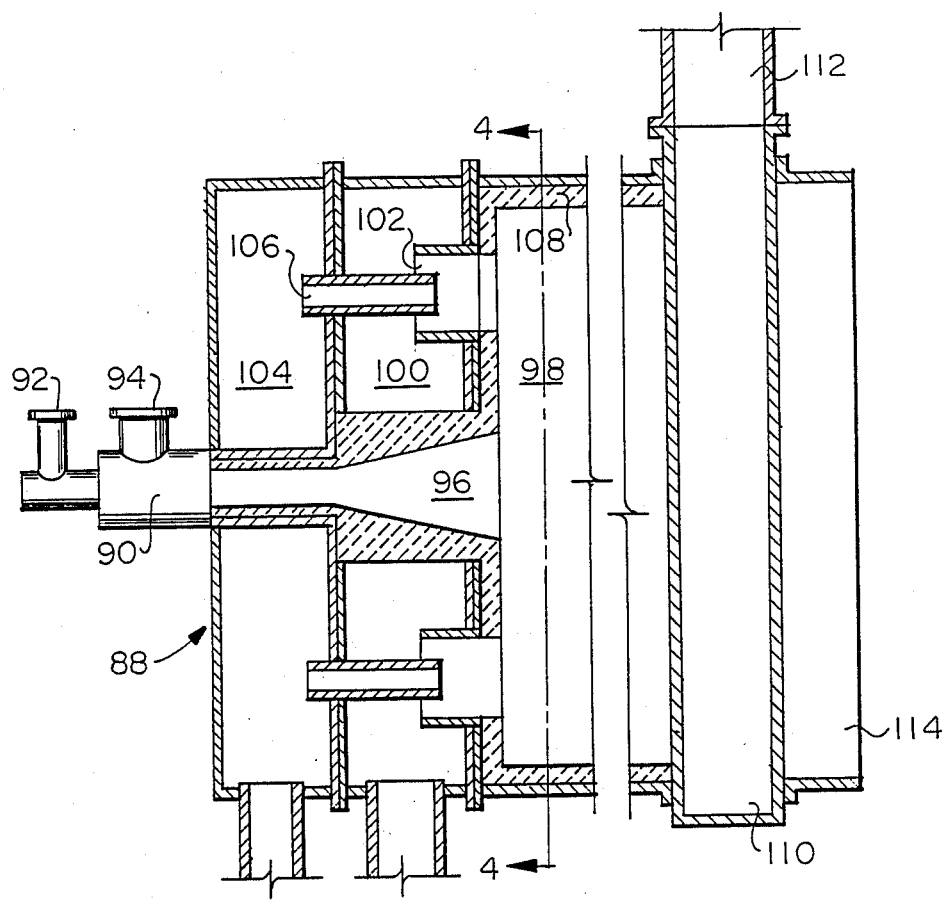
FIG. 3 is a side elevation, in cross-section, of a furnace used in the invention.
Figure 4:
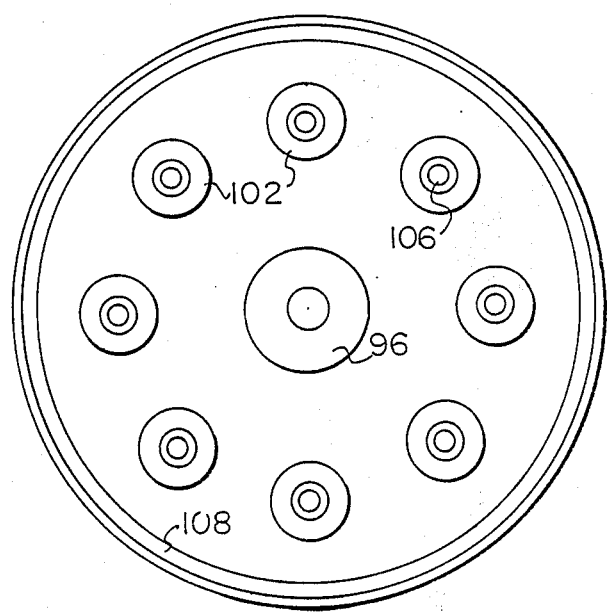
FIG. 4 is a cross-section taken on the line 4—4 of FIG. 3.

FIGS. 3 and 4 show furnace 88 in more detail. Burner 90 has fuel inlet 92 and air inlet 94. Burner 90 is a standard commercial item. Burner 90 is mounted on one end of furnace 88 and directs its flames through refractory lined combustion chamber 96 into contaminent combustion chamber 98. The reflux gas from blower 84 is supplied to reflux gas manifold 100 and passes through annular nozzle portions 102 which are circumferentially spaced about burner combustion chamber 96. The air from blower 88 is supplied to air manifold 104 and passes through cylindrical nozzle portions 106 disposed within annular nozzle portions 102. The reflux gas—which includes the combustible contaminants combines with the air, which serves as the oxidizer, to convert the reflux gas to nonhazardous products of combustion.

Contaminant combustion chamber 98 has a refractory lining 108 and terminates at stack manifold 110. Stack manifold 110 is an enlarged section at the end of combustion chamber 98 which conveys products of combustion to stack 112. Furnace 88 terminates in exhaust section 114 which introduces a portion of the products of combustion into volatilizer 52 as described above.

For some purposes the products of combustion which pass into stack 112 will require further treatment. For these cases stack 112 would be equipped with a cover and a bypass passage to convey the gases to the scrubbers or other equipment.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A system for removing liquid contaminants from solid materials comprising:
   a longitudinally extending, rotatably mounted housing with a first end and a second end;
   a first inlet for receiving hot gas and a discharge for solids each disposed at said first end of said housing;
   a second inlet for receiving contaminated solids and an outlet for gases each disposed at said second end of said housing;
   said housing having an inner surface and a plurality of spaced lifting flights extending inwardly from said surface;
   drive means for rotating said housing;
   a furnace having an exhaust at one end positioned to deliver products of combustion to said first inlet;
   a damper connected to said outlet, whereby flow of gas through said housing can be controlled;
   said rotating housing continuously lifting and spilling solid materials passing therein to expose liquid contaminants to the hot gas causing vaporization of said contaminants and separation from said solid materials;
   said furnace having a longitudinally extending, contaminant combustion chamber;
   a burner axially disposed at the other end of said furnace;
   a burner combustion chamber disposed between said burner and said contaminant combustion chamber;
   a plurality of spaced nozzles disposed about said burner combustion chamber;
   each of said nozzles having a central oxidizer portion and a reflux gas portion;
   each of said oxidizer portions being connected to an oxidizer manifold;
   each of said reflux gas portions being connected to a reflux gas manifold connected to receive gas from said outlet;
   an exhaust at the other end of said furnace;
   a stack extending from said contaminant combustion chamber at a location axially spaced from said exhaust.

2. A system for removing liquid contaminants from solid materials in accordance with claim 1 wherein:
   said oxidizer manifold and said reflux gas manifold are longitudinally disposed from each other at said first end of said furnace.

3. A system for converting volatilized liquid contaminants products of combustion comprising:
   a furnace having a longitudinally extending, cylindrical contaminant combustion chamber lined with refractory material;
   a burner axially disposed at one end of said furnace;
   a burner combustion chamber having a refractory lining disposed between said burner and said contaminant combustion chamber;
   a plurality of circumferentially spaced nozzles disposed about said burner combustion chamber;
   each of said nozzles having a central, cylindrical oxidizer portion and a concentric, annular reflux gas portion;
   each of said oxidizer portions being connected to an oxidizer manifold;
   each of said reflux gas portions being connected to a reflux gas manifold;
   said reflux gas manifold connected to receive volatilized liquid contaminents;
   an exhaust at the other end of said furnace;
   a stack extending orthogonally from said contaminant combustion chamber at a location axially spaced from said exhaust.

4. A system for converting volatilized liquid contaminants to products of combustion in accordance with claim 11 further including:
   a longitudinally extending, rotably mounted cylindrical housing with a first end and a second end;
   a first inlet connected to receive hot gas from said furnace and having a discharge for solids each disposed at said first end of said cylindrical housing;
   a second inlet for receiving contaminated solids and an outlet for gases each disposed at said second end of said cylindrical housing;
   said housing having an inner cylindrical surface and a plurality of spaced lifting flights extending inwardly from said surface;
   drive means for rotating said housing;
   a hot gas supply connected to said first inlet;
   a damper connected to said outlet, whereby flow of gas through said housing can be controlled;
   said rotating cylindrical housing continuously lifting and spilling solid materials passing therein to expose liquid contaminants to the hot gas causing vaporization of said contaminants and separation from said solid materials.

5. A system for converting volatilized liquid contaminants to products of combustion in accordance with claim 4 further including:
   a dust separator connected to said outlet.

6. A system for converting volatilized liquid contaminants to products of combustion in accordance with claim 5 further including:
   a blower having its intake connected to said outlet for drawing gases from said outlet and supplying them to said reflux gas manifold.

7. A system for removing liquid contaminants from solid materials comprising:
   a longitudinally extending, rotatably mounted cylindrical housing having a first end and a second end;
   a furnace having an exhaust at one end positioned to deliver products of combustion to said first end of said housing;
   said furnace having a burner at the other end having inlets for fuel and oxidizer;
   a contaminant combustion chamber positioned between said furnace exhaust and said burner;
   at least one volatilized liquid contaminent nozzle oriented to deliver volatilized liquid contaminants into said contaminant combustion chamber;
   a stack extending from said contaminant combustion chamber at a location spaced from said exhaust;
   a housing discharge for solids disposed at said first end of said housing;
   a housing inlet for receiving solids containing liquid contaminants at said second end of said housing;

a housing outlet for volatilized liquid contaminants disposed at said second end of said housing;

conveying means for receiving volatilized liquid contaminants at said second end of said housing and delivering said volatilized liquid contaminants to said inlet for volatilized liquid contaminants of said furnace.

8. A system for removing liquid contaminants from solid materials in accordance with claim 7 further including:

a dust separator connected to receive said volatilized liquid contaminants from said housing outlet and to deliver said volatilized liquid contaminants to said conveying means.

9. A system for removing liquid contaminants from solid materials in accordance with claim 8 wherein:

said dust separator is an inertial separator.

10. A system for removing liquid contaminants from solid materials in accordance with claim 8 wherein:

said dust separator is a baghouse.

11. A system for converting volatilized liquid contaminants to products of combustion comprising:

a furnace having a contaminant combustion chamber in which volatilized liquid contaminants are oxidized;

a burner disposed at one end of said furnace;

a burner combustion chamber disposed between said burner and said contaminant combustion chamber;

a plurality of volatilized liquid contaminant nozzles oriented to deliver volatilized liquid contaminants separated from contaminated soil into said contaminant combustion chamber;

a source of oxidizer oriented to deliver oxidizer into said contaminant combustion chamber;

an exhaust at the other end of said furnace supplying hot products of combustion for on going volatilization of liquid contaminants from contaminanted soil and delivery into said volatilized liquid contaminant nozzles.

12. A system for converting volatilized liquid contaminants to products of combustion in accordance with claim 11 wherein:

said source of oxidizer is a plurality of oxidizer nozzles.

13. A system for converting volatilized liquid contaminants to products of combustion in accordance with claim 19 further including:

a longitudinally extending, rotatably mounted cylindrical housing with a first end and a second end;

said first end of said housing positioned to receive said products of combustion from said exhaust of said furnace;

said first end of said housing also having a discharge for soil having volatilized liquid contaminants separated therefrom;

said second end of said housing having an inlet for contaminated soil and an outlet for volatilized liquid contaminants;

conveying means for receiving said volatilized liquid continents from said outlet for volatilized liquid continents and delivering said volatilized liquid contaminants to said volatilized liquid contaminant nozzles.

14. A system for converting volatilized liquid contaminants to products of combustion in accordance with claim 13 wherein:

said conveying means includes seriatim: an inertia separator, a baghouse and a fan.

* * * * *

UNITED STATES PATENT AND TRADEMARK OFFICE
CERTIFICATE OF CORRECTION

PATENT NO. : 4,827,854

DATED : May 9, 1989

INVENTOR(S) : Jerry R. Collette

It is certified that error appears in the above-identified patent and that said Letters Patent is hereby corrected as shown below:

In Column 6, Line 16, change "11" to -- 3 --.

In column 8, Line 3, change "contaminanted" to -- contaminated --.

In column 8, Line 13, change "19" to -- 11 --.

Signed and Sealed this

Ninth Day of January, 1990

Attest:

JEFFREY M. SAMUELS

*Attesting Officer*  *Acting Commissioner of Patents and Trademarks*